Patented Oct. 17, 1950

2,526,302

UNITED STATES PATENT OFFICE 2,526,302

MARGARINE PRODUCT AND METHOD OF FORMING

Vernon L. Turgasen, Crete, Ill.

No Drawing. Application January 19, 1949,
Serial No. 71,761

7 Claims. (Cl. 99—122)

This invention relates to a margarine production and to the methods of forming the same.

Margarine, as sold on the market today, has made considerable progress since its inception in 1870. It is usually produced through the hydrogenation of liquid fats, oils, or oleo stock and its derivatives, and through mixing with skimmed milk in which flavoring materials are developed. Hackh's Chemical Dictionary, 3rd edition, defines margarine as "a butter substitute which consists of a solid emulsion of fats in milk serum." In the production, the margarine fat remains in a continuous phase while the milk serum is in a water-milk solids phase and the product possesses a definite gummy or stocky texture. Upon being taken into the mouth it sticks to the tongue and palate as an oily or greasy substance. In spite of the advance that has been made in the flavoring of the product, the margarine still possesses this undesirable characteristic in texture, producing a sensation of greasiness when taken into the mouth.

The texture of butter is quite different from that of margarine in that it gives a smooth, waxy feel to the tongue and palate and does not suggest greasiness. The waxy characteristic of butter has long been sought for margarine but it is believed that no one has been able to achieve the waxy butter texture in margarine up to the present invention.

An object of the present invention is to produce margarine having a waxy and non-greasy texture characteristic of butter. The further object is to provide processes by which margarine fats may be effectively processed in milk to produce margarine which does not produce a greasy sensation when taken into the mouth, but which on the other hand possesses a texture similar to that of butter and gives a smooth, waxy feel when taken into the mouth. Other specific objects and advantages will appear as the specification proceeds.

In one embodiment of my invention, the margarine fat is mixed with milk at temperatures sufficient to keep the fat in molten condition and thereafter the mixture is subjected to conditions which disperse the fat in small globules in the milk so that the globules become encased with milk protein. Thereafter, the mixture is cooled and churned in the usual manner of treating butter cream to obtain aggregates of the fat globules. The fluid milk is then drawn off and the resulting fat body washed, salted, and treated in very much the same manner as butter.

The above process consists of two main phases. In the first phase, the margarine fat is broken up into small globules under conditions which cause the milk protein to encase the globules. In this phase, a stable emulsion is produced which is cream-like in character. In the second phase of the process, the emulsion is cooled and churned bringing about the coalescence and aggregation of the globules. There is here produced a reversal in phase in that the encased fat globules are in substantially continuous phase and air and water bodies are dispersed therein. It is this reversal of phase in which the fat globules form aggregates, the globules being encased with a protein membrane while air and water in minute bodies, are also encased with protein membranes and dispersed among the fat globules, that give the produce its desired waxy texture characteristic of butter.

In the practice of my invention, any of the margarine fats may be employed. These fats are many and varied in characters but are well known in the margarine field. Cotton seed oil, soy bean oil, neutral lard, coconut oil, palm kernel oil, babassu oil, and other well known oils or fats which are commonly referred to as "oleo margarine," or "oleo stock" or "oleo oil" may be used singly or in admixture in preparing the margarine fat, the proper consistency of which is obtained usually by blending the various stock in proper proportions. The fat may be prepared by the hydrogenation of a normally liquid oil and there are usually processing steps for deodorizing the oil or removing undesirable constituents. Since the preparation of margarine fat by such methods of mixture, hydrogenation, etc., are all well known, it is believed sufficient here to state that any of the fats so prepared may be effectively used in the present processes.

In my new process, I mix the margarine fat of suitable melting point, preferably in the range of from 86° to 98° F. with milk such as skim milk or whole milk, etc. I prefer to use from 25% to 45% of the margarine fat with 55% to 75% milk. Milk may be sweet or uncultured or, if preferred, ripened with a specific culture of flavor producing organisms. Similarly the milk may be acidified by bacterial action or by the addition of an organic acid, etc., depending upon the resulting flavor desired, or it may be left in its normal state.

Margarine fat is preferably heated to a point above its melting point and added to the milk in a tank or mixing vat where suitable agitation is employed to produce a mixture or blend of the milk and fat. It is not here necessary to create an emulsion in such mixing, but merely a mixture or blend and the temperature of the liquid mixture should be above that at which the fat would solidify.

It is well known that milk proteins possess the property of lowering the surface tension of a water medium. This property of the protein constituents of milk leads to relationships that are important from the standpoint of dispersion of fats and the stability of the oil in the milk serum. In the presence of milk proteins as stabilizing or emulsifying agents, I now proceed to prepare a stable emulsion of high concentration, the adsorbed protein film preventing the coalescence of the dispersed fat. This orientation of the protein-milk film to the fat globules is accomplished in the next step of my process.

The margine fat-milk mixture from the mixing tank is introduced into a tube or vessel and exposed to steam under pressure. I prefer to introduce the steam in needle-like jets into the liquid and in the direction of the flowing liquid. The vessel is equipped with a restricted orifice or preferably with a valve which can be regulated so as to maintain the desired amount of back pressure on the steam, fat, and milk mixture. The steam raises the temperature of the mixture to a point corresponding to the pressure and the needle-like jets partially disperse a continuous fat phase into one of a fat-in-milk emulsion. At the same time the steam treatment appears to alter the milk proteins so that they orient themselves to the surface of the globule. The pressure and temperature to be maintained on the flowing liquid may vary widely depending upon the fat used and the degree of dispersion desired. Effective results have been obtained in different runs with temperatures varying between 200° F. to 300° F. but it will be understood that this range may be increased depending upon the character of the fat used.

In the next step, the hot flowing fat-milk emulsion is released into a chamber or vessel under partial vacuum or into a zone of reduced pressure. Due to the difference in boiling points at the pressure at or above atmospheric maintained in the tube and at the reduced pressure prevailing in the vacuum chamber, the mixture on entering the vacuum chamber through the valve or restricted orifice, is in the form of a fog-like mist. While some partial dispersion has occurred in the tube through the injection of steam, and particularly through the injection of the steam in needle-like jets, the final and main step in dispersing the fat in the milk in the form of small globules is accomplished in this latter step. When the liquid is released suddenly from the higher pressure to the reduced pressure, the fat sub-divides into small globules and is dispersed throughout the medium. Further, in this operation, protein membranes are formed about the globules and the fat-liquid interfaces so as to stabilize the suspended globules and prevent their coalescence. The result is a heavy stable cream-like emulsion.

Variations in the temperature of the fat-milk emulsion cause variations in the viscosities and surface tensions as well as interfacial tensions of the phases. The degree of dispersion or the efficiency of the process increases, within certain limits, with increases in temperature. Best results have been obtained by maintaining a tube pressure of 15 pounds and a corresponding temperature of 250° F. and a vacuum chamber at 25 inches of mercury. These pressures and temperatures dispersed the fat into globules which varied in size from 2 to 5 microns. The resulting product consists of a highly stable emulsion having the appearance and taste of cream in the same stage of process as used for butter making.

The foregoing process is not dependent upon any particular apparatus and may be used in structures of widely varying form. If desired, the process may be carried out in the type of pasteurizing apparatus shown in U. S. Patents 2,238,373; 2,115,470; 2,130,643; 2,130,645; or 2,130,644.

The fat-milk emulsion or cream is now cooled by pumping the same continuously from the vacuum chamber over a conventional cream or milk cooler provided with a refrigerating medium and the temperature of the cream is preferably brought to a point somewhat below the solidifying point of the fat. If desired, the emulsion can be transferred to a holding or storage vat and synthetic flavors or milk cultures may be added thereto to improve the flavor of the finished margarine.

The fat globules in the emulsion now exist physically in the same state as they exist in milk fat. The fat globules have membranes enclosing them and consist of a protein complex substance. Such globules are intersperced in the milk medium.

The fat-milk emulsion is next churned to produce aggregates of fat. The churning may be carried out in any conventional manner as for example, a conventional butter churn, where it is treated in exactly the same manner as cooled cream for butter making. The agitation or churning results in the aggregation of fat globules and in progressive growth of the clumps or aggregates. When the ratio of the surface area of the clumps to their cubical content becomes relatively small, the emulsion breaks suddenly and the fat separates in the form of a plastic mass. In this operation, the agitation or churning results in beating air into the emulsion and in this phenomenon, the fat globules aggregate in the air-serum interfaces which serve as mediums for bringing the globules into contact, thereby increasing the rate of aggregation.

In the above operation, the smaller air bubbles are more effective than the larger ones since they are more stable and hence, as the aggregates join together, these small air bubbles become sufficiently minute to assume stability and become a part of the aggregate. Such bubbles are encased by a protein sheath and are incorporated in the fat aggregate or mass. Also, small water droplets are formed during the churning operation and these are likewise stabilized by the protective protein casings and by the fat globules collecting in the interfaces. These small water droplets are likewise incorporated into the mass of margarine. The margarine product thus consists of fat globules, air bubbles, and water droplets, each being surrounded by protein films. A small amount of the fat may be found in the unprotected state without hydrated protein films encasing it.

The appearance of the aggregates of globules at this stage have the characteristics of butter. When the size of these aggregates reach the size of a small pea, the churning operation is stopped and the milk not retained in the mass is withdrawn. The moisture content of the aggregates at this point is usually found within the range of 13.6% to 14.5% which is in the same range of the moisture retention of butter granules in the same stage of churning. Further, the curd or milk-solids-not-fat contents of the margarine produces in this manner averages about 0.8%, which is identical with that of butter.

After removing the milk from the margarine granules, they may be washed with cold water to prepare them for further working. The wash water may be then drained and salt added, and any deficiency in water being made up as desired. The mass is then worked in the churn as usual in butter making. The factors influencing working time are the same as for butter and they are well understood by those skilled in the art of butter making.

After the working step, the margarine is removed from the churn and packed in boxes or on trucks, etc. It may be held for further cutting and wrapping into consumer packages, or it may be printed immediately using certain types of automatic printing equipment, etc.

It will be noted that in the foregoing process, the dispersion steps accomplished by bringing the material under pressure and releasing it, etc., alter the character of the product by causing the proteins of the milk to adsorb, or adhere, or to orient themselves upon the surface of the fat globules. When the material is then churned, the fat globules are brought together while the air and water also produce minute bodies encased by the protein film and these minute bodies are interfaced throughout the fat. Thus in the latter stage there is a reversal of phase in that now the water and air are dispersed within the fat globules and the resulting mass has the texture of butter in that it is waxy and non-greasy in character and feel when taken into the mouth.

Specific processes may be set out as follows:

*Example 1*

800 pounds of hydrogenated and deodorized cotton seed oil having a Wiley melting point of 36° C., iodine value 64, and congealing point of 28° C. were heated to 120° F. and added to 1200 pounds of fresh, unripened skim milk in a forewarmer equipped with a mixing coil. The mixture was agitated to keep the oil from separating and forming a layer on the milk.

The above unstable mixture was then pumped to a pasteurizer of the type described in said above patents and live steam was introduced into the flowing liquid. The temperature of the liquid was then raised to 250° F. and back pressure was maintained on the spring loaded valve so that the pressure in the tube registered about 15# per square inch gauge. This hot mixture was admitted to the vacuum chamber where a vacuum of 25 inches of mercury was maintained. The hot mixture flashed into the vacuum pan in a fog and the temperature reduced immediately to 138° F. It was then pumped rapidly from the vacuum chamber to a surface cream cooler where the temperature was reduced to 46° F. The fat exhibited no evidence of clumping or graining out and appeared to have all the physical characteristics of churning cream.

The mixture was then pumped into a 2000 pound capacity rotary churn and the churn put into motion. The first evidence of the appearance of granules came after 35 minutes of churning and the granules were the size of a small pea in 45 minutes. The moisture content was 14.3%. The skim milk was drained and cold water at 42° F. was added to the granules and left for ten minutes. This wash water was drained and salt added to the granules at the rate of 2% of the finished margarine. Starter distillate was added for flavor. The churn was again set into motion and the margarine worked up to the desired body and texture in 12 minutes.

Samples of the margarine were submitted to a number of people familiar with and well qualified to judge butter. It was their unanimous expression that the body and texture of this product was like butter, and free from the greasiness of margarine.

*Example 2*

A mixture of hydrogenated cotton seed oil and soy bean oil was used to produce the margarine fat, the resulting fat having a melting point close to 92° F. The temperature was raised above 100° F. and the fat and milk mixed in similar proportions to those described in Example #1. The process was otherwise the same as described in Example #1 and the same results were obtained.

In addition to the above, margarine fat, produced from common oleo oil sources, and/or cotton seed oil, soy bean oil, neutral lard, coconut oil, palm kernel oil, babassu oil and mixture thereof was used in the preparation of the new product, and the same results were obtained. The margarine fat and milk mixtures in the proportions of about two parts of milk to one part of fat were heated in a mix vat to temperatures ranging from 100° F. to 200° F. and then later passed through the pressure tube and subjected to the action of live steam for pressures slightly above atmospheric up to 15 pounds and more. Upon discharge of the material into the vacuum chamber at a temperature below atmospheric and sufficiently low to bring the material into the form of a mist, the fat was broken up into small globules which became coated with protein films. Upon cooling and churning, a product like that described in Example #1 was obtained.

The new margarine product is characterized by its waxy and butter-like texture, consisting of smooth non-sticky, waxy granules. In structure, the new product consists of the fat in the form of small individual globules united together in aggregates, with minute air bodies and water droplets also enclosed by protein films and dispersed along the interfaces of the fat globules.

While in the foregoing specification, I have set forth specific embodiments of the invention in considerable detail for the purpose of illustrating the invention, it will be understood that such details may be varied widely by those skilled in the art without departing from the spirit of my invention.

I claim:

1. A waxy margarine product consisting of an admixture of margarine fat globules, water droplets, and minute air bubbles, said globules, droplets, and air bubbles having envelopes of milk protein, the fat globules being united in aggregates and said droplets and air bubbles being dispersed therethrough in discontinuous phase.

2. A waxy margarine product consisting of an admixture of minute margarine fat globules, milk protein film encasing the bulk of said globules, and minute air bubbles and water droplets encased by protein film, said encased droplets and air bubbles being dispersed through the mass of margarine fat globules and between the interfaces thereof in discontinuous phase.

3. In a process for margarine manufacture, the steps of mixing margarine fat globules with milk, mixing the same with steam under pressure in a confined zone, releasing said mixture from said pressure zone into a zone of reduced pressure to break up the fat into small globules and to unite the protein of the milk in casing films about said globules to produce a stable cream, and churning said cream to produce fat masses with interspersed air and water droplets therein, and separating said masses from the fluid milk.

4. In a process for margarine manufacture, the steps of mixing margarine fat with milk, mixing steam with said mixture in a confined zone under pressure, releasing said mixture from said pressure zone under vacuum to form a mist, withdrawing the mixture from said vacuum zone and cooling the same to a temperature below the solidifying point of said fat, churning the mixture to form fat masses, and separating said masses from the liquid milk.

5. In a process for margarine manufacture, the steps of mixing margarine fat with milk, impinging jets of live steam upon the mixture while in a confined zone under pressure, releasing said mixture from said pressure zone into a zone of reduced pressure whereby said fat is broken into minute fat globules and the proteins of the milk adhere to said globules, churning the resulting material to produce fat masses with interspersing air and water droplets therein, and separating said masses from the fluid milk.

6. In the manufacture of margarine, the steps of mixing margarine fat with milk, heating to 100–300° F. under atmospheric pressure, impinging jets of live steam upon the mixture, passing the mixture through an orifice into a zone of reduced pressure to disperse the fat into small globules in the milk, cooling the mixture, and churning to obtain aggregates of said globules, and separating the fluid milk therefrom.

7. In the manufacture of margarine, the steps of mixing margarine fat with milk, maintaining the mixture at a temperature above the solidifying point of the fat, heating the mixture to a temperature of from 200–300° F. while maintaining the mixture under the atmospheric pressure, directing live steam into the mixture, releasing the mixture in the form of a mist into a zone of reduced pressure to disperse the fat in small globules in the milk while causing the protein of the milk to adhere to the globules, cooling the mixture to a temperature below the solidifying point of the fat, and churning the mixture to obtain aggregates of said globules and to introduce air and water droplets within said aggregates, and separating the fluid milk therefrom.

VERNON L. TURGASEN.

REFERENCES CITED

The following references are of record in the file of this patent:

UNITED STATES PATENTS

| Number | Name | Date |
|---|---|---|
| 1,958,975 | Reynolds et al. | May 15, 1934 |

FOREIGN PATENTS

| Number | Country | Date |
|---|---|---|
| 366,541 | Great Britain | Feb. 5, 1932 |

OTHER REFERENCES

"The Manufacture of Margarine," by Andersen, Food, February 1944, pages 37–42.